United States Patent [19]

Brazell

[11] Patent Number: 5,603,173
[45] Date of Patent: Feb. 18, 1997

[54] SNOW THROWER

[75] Inventor: Kenneth M. Brazell, Phoenix, Ariz.

[73] Assignee: Ryobi Outdoor Products Inc., Chandler, Ariz.

[21] Appl. No.: 556,825

[22] Filed: Nov. 2, 1995

Related U.S. Application Data

[63] Continuation of Ser. No. 188,960, Jan. 28, 1994, abandoned.

[51] Int. Cl.⁶ .......................................................... F01H 5/00
[52] U.S. Cl. .................................... 37/244; 37/246; 37/260
[58] Field of Search .............................. 30/296, 296 R; 38/233, 243, 244, 246, 248, 250, 251, 237, 260, 261, 262

[56] References Cited

U.S. PATENT DOCUMENTS

| | | |
|---|---|---|
| Re. 33,726 | 10/1991 | Thorud et al. . |
| 3,429,060 | 2/1969 | Merry . |
| 3,690,047 | 9/1972 | Thoen et al. ........................... 37/243 X |
| 4,122,601 | 10/1978 | Katsuya .................................... 30/296 |
| 4,190,972 | 3/1980 | Berner . |
| 4,286,675 | 9/1981 | Tuggle . |
| 4,294,027 | 10/1981 | Edward ..................................... 37/259 |
| 4,295,285 | 10/1981 | Stevens ................................. 37/259 X |
| 4,329,792 | 5/1982 | Berner .................................. 37/259 X |
| 4,346,526 | 8/1982 | Mattson et al. . |
| 4,365,430 | 12/1982 | Myerly . |
| 4,378,644 | 4/1983 | Tuggle et al. . |
| 4,397,088 | 8/1983 | Hampel ..................................... 30/296 |
| 4,505,040 | 3/1985 | Everts . |
| 4,893,368 | 1/1990 | Ward . |
| 4,897,942 | 2/1990 | Klas et al. . |
| 5,161,318 | 11/1992 | Bergman et al. . |
| 5,181,369 | 1/1993 | Everts . |
| 5,269,082 | 12/1993 | Sund et al. ................................ 37/259 |

Primary Examiner—Eric K. Nicholson
Assistant Examiner—Robert Pezzuto
Attorney, Agent, or Firm—Brooks & Kushman P.C.

[57] ABSTRACT

A portable, hand-held snow thrower comprising a power unit and an attachment removably securable to the power unit. The attachment includes an impeller having a first pulley and a flexible drive shaft. A first end of the drive shaft is connected to the power unit, and a second end of the drive shaft is drivably connected to a second pulley lying substantially in a plane with the first pulley. A lower portion of the drive shaft is curved and extends through an impeller housing. The second pulley is operably connected to the first pulley to provide a gear ratio therebetween resulting in a desired rotational speed of the impeller.

5 Claims, 2 Drawing Sheets

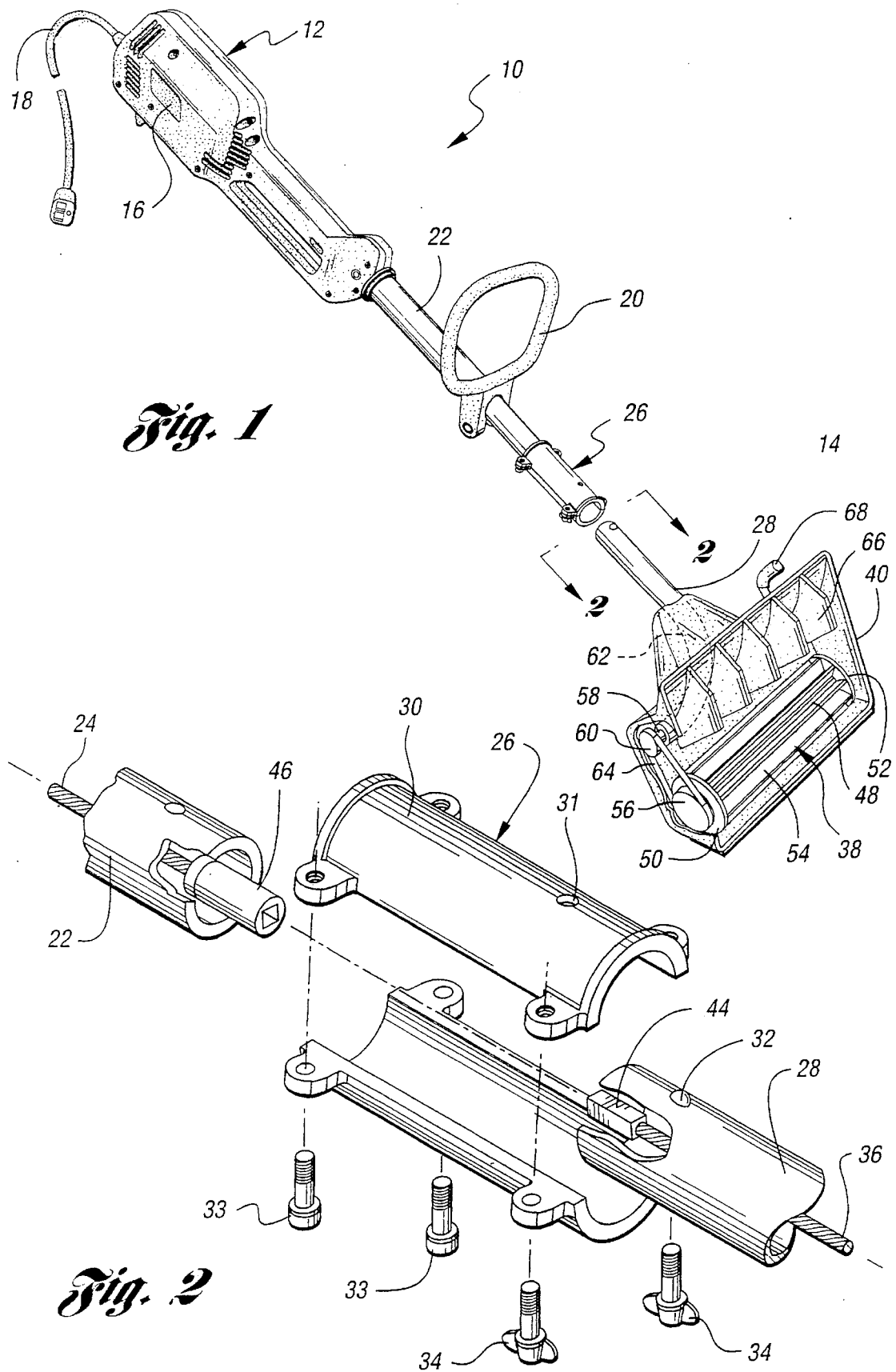

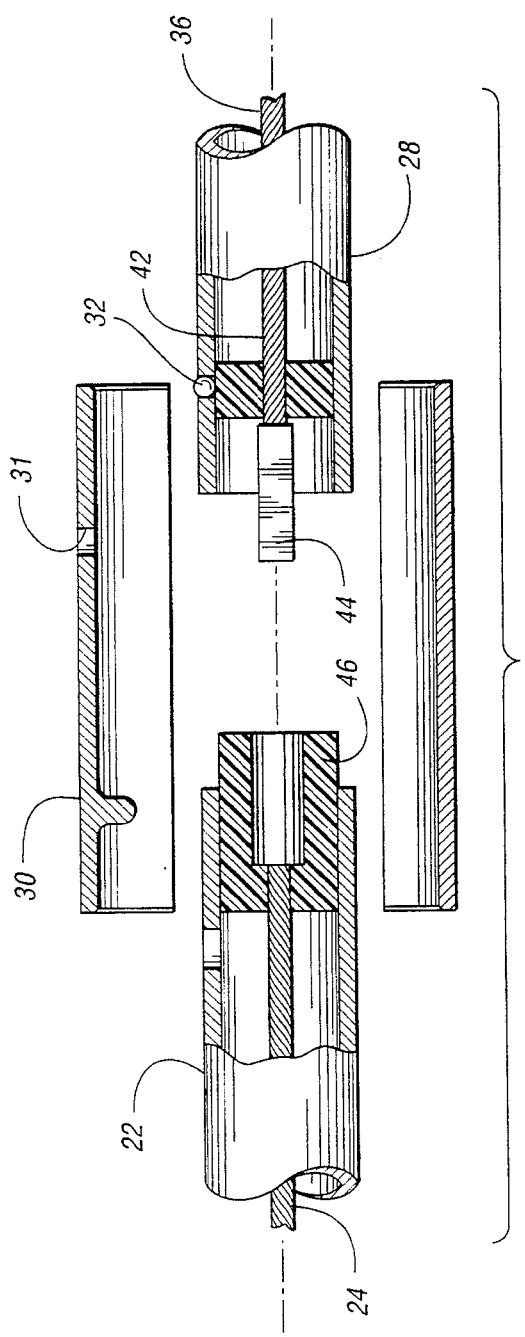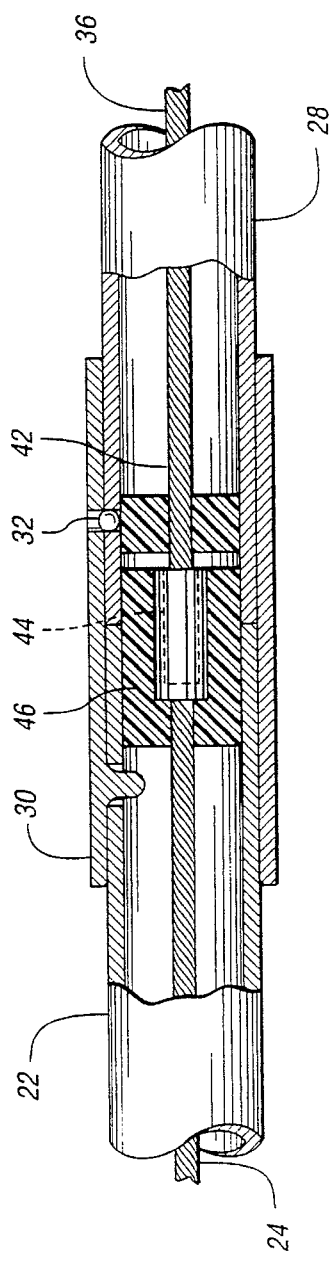

5,603,173

SNOW THROWER

This is a continuation of application Ser. No. 08/188,960 filed on Jan. 28, 1994, now abandoned.

Technical Field

This invention relates to snow throwers, and more particularly an add-on snow thrower attachment having a flexible drive shaft connected to a belt and pulley drive for providing an optimum impeller speed.

BACKGROUND ART

Small snow throwers for home use are typically of two general types. In the first type of construction, an electric motor for driving a snow throwing impeller is located near the bottom of the unit. U.S. Pat. No. 4,190,972 to Berner, for example, shows a corded snow remover having an electric motor situated near ground level. Frequently, such snow throwers are provided with wheels to help support their weight and facilitate the mobility of the unit. U.S. Pat. No. 4,346,526 to Mattson et al. discloses such a wheeled snow thrower.

In the second type of construction, the motor is situated away from ground level and turns an elongated drive shaft. However, a drive shaft of this sort must be combined with a right angle gear box at the bottom of the unit so that the impeller is rotated around a horizontal axis. For instance, U.S. Pat. No. 5,161,318 to Bergman et al. discloses a hand held power sweeping tool having a rotatable shaft driven by a gas or electric motor. The shaft drives a worm that engages a worm gear to turn a sweeper about a horizontal axis. Similarly, U.S. Pat. No. 4,378,644 to Tuggle shows a hand carried snow thrower having an internal combustion engine which drives a shaft that is turned 90 degrees by a bevel gear pinion and a driven gear, the latter of which is pinned to an output shaft.

SUMMARY OF THE INVENTION

The present invention is a snow thrower which comprises a power unit and an attachment removably securable to the power unit. The attachment includes an impeller having first gear means and a flexible drive shaft. The flexible drive shaft has a first end adapted for connection to the power unit, and a second end drivably connected to second gear means. The second gear means lies substantially in a plane with the first gear means, and is operably connected to the first gear means to provide a gear ratio therebetween resulting in a desired rotational speed of the impeller.

Accordingly, it is an object of the present invention to provide a snow thrower of the type described above eliminates the traditional gearbox and replaces it with a simple belt and pulley drive system.

Another object of the present invention is to provide a snow thrower of the type described above which is lightweight and easily portable.

Still another object of the present invention is to provide a snow thrower attachment of the type described above which is releasably attached to an electric motor power unit spaced apart from ground level.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a perspective view of a snow thrower according to the present invention;

FIG. 2 is an exploded perspective view of a connection between a power unit and a snow thrower attachment of the present invention;

FIG. 3 is a cross-sectional view of the connection shown in FIG. 2 is a disassembled state; and FIG. 4 is a cross-sectional view of the connection shown in FIGS. 2 and 3 in an assembled state.

BEST MODE FOR CARRYING OUT THE INVENTION

With reference to the drawings, the preferred embodiments of the present invention will be described. FIG. 1 shows an apparatus 10 according to the present invention for use in throwing or blowing snow or other debris lying on the ground. The snow thrower 10 comprises a power unit 12 and an attachment 14.

The power unit 12, such is marketed by the assignee of the present invention under the tradename "Trimmer Plus," preferably includes an electric motor 16 to which standard 110 volt current is supplied through a conventional cord 18. Alternatively, a power unit having a small displacement two-cycle or four-cycle internal combustion engine is readily substitutable. It should also be understood that a power unit which draws its electrical energy from a rechargeable electrical storage battery is equally functional, although such a unit is likely to have a relatively short operational life between rechargings. A slidable handle 20 is provided on an upper boom 22 projecting from the housing of the power unit 12 so that the snow thrower 10 is grippable by one of an operator's hands to make the snow thrower substantially portable.

As shown in FIGS. 2 through 4, the power unit 12 turns, regardless of its source of power, an output shaft such as a cable 24 extending through the upper boom 22. A cast aluminum click link collar 26 provided on the lower end of the boom 22 supplies a means for removably securing the power unit 12 to a mating boom 28 of the attachment 14. In particular, an upper half 30 of the collar 26 has a hole 31 through which a spring loaded button 32 on the lower boom 28 may snap into, a pair of permanent fasteners 33, and a pair of wing nuts 34 that may be tightened to secure the connection between the booms 22 and 28.

The attachment 14 also includes a flexible drive shaft 36 which extends through the lower boom 28, and an auger or impeller 38 mounted in a housing 40 as best shown in FIG. 1. The flexible drive shaft 36 is also preferably a cable, and has a first or upper end 42 adapted for connection to the power unit 12. This connection may be formed in any known manner, and in a preferred embodiment is accomplished with a male connector 44 of generally square cross-section that telescopically fits into a female connector 46 attached to the lower end of the upper drive shaft 24. Further details of the connection are described in U.S. Pat. No. 4,505,040 entitled "Coupling For Interconnecting Two Handle Portions Of A Power Driven Implement," which is hereby incorporated by reference.

Referring again to FIG. 1, the impeller 38 is of conventional construction including an inner drum 48, a pair of end discs 50 and 52, and a plurality of blades 54 extending radially from the drum between the end discs. Adjacent one of the end discs 50 is drivably fixed a pulley 56, either directly or through an engageable clutch mechanism. A second end 58 of the flexible drive shaft 36 is drivably connected to a second pulley 60 situated generally above and behind the driven pulley 56. Both pulleys, however, lie substantially in the same vertical plane. Between its ends 42 and 58, the flexible drive shaft 36 is curved along at least the lower portion of its length. The curved portion of the flexible drive shaft 36 extends through a curved boom 62 inside the impeller housing 40.

The driving pulley 60 is operably connected through a V-belt 64 to the driven pulley 56. The relative diameters of, and hence the gear ratio between, the pulleys 56 and 60 are chosen so that a desired rotational speed of the impeller 38 can be achieved. For example, given the operational speed of the upper drive shaft 24, and the corresponding rotational speed of the flexible drive shaft 36 and the driving pulley 60, the size of the driven pulley 56 is generally greater than the size of the driving pulley. This results in a gear ratio of the driving pulley 60 to the driven pulley 56 of less than one. For a flexible drive shaft 36 with a maximum rotational speed of between about 12,000 and 13,000 revolutions per minute (rpm), which is typical of the unloaded electrical power unit 12, the gear ratio is advantageously in the range of about 6:1 to 6.5:1. This results in a reduced impeller speed of about 2000 rpm, but increased torque with respect to the upper pulley 60. For a gasoline engine power unit with a maximum unloaded speed of 10,000 rpm, the gear ratio is advantageously set in the range less than about 5:1.

With the belt and pulley system described, no gearbox is necessary to drive the impeller 38 of the snow thrower. The absence of a traditional gearbox results in reduced overall weight of the snow thrower, as well as a corresponding portability so that no ground-engaging wheels are necessary. While a preferred embodiment of the snow thrower 10 is illustrated in the drawings with a belt and pulley system, it should be appreciated that any gear means such as toothed gears with a chain drive are substitutable.

The impeller housing 40 includes a plurality of vanes 66 for directing snow thrown by the impeller 38. The vanes 66 lie generally in a vertical plane, and their direction is adjustable as by a handle 68 so that snow exiting from the impeller is thrown either rightwardly or leftwardly of the forward direction of travel of the snow thrower 10.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. A snow thrower comprising:

a power unit; and an attachment removably securable to the power unit, the attachment including:

a housing;

an impeller pivotably mounted to the housing for rotation about a horizontal axis, the impeller having a first pulley, and a flexible drive shaft having first and second ends, the first end being adapted for connection to the power unit, and the second end being drivably connected to second pulley rotatable about an axis spaced from and parallel the horizontal axis, the second pulley lying substantially in a plane with the first pulley, the second pulley being operably connected to the first pulley by a drive belt to provide a gear ratio therebetween resulting in a desired rotational speed of the impeller, wherein the flexible drive shaft is bent substantially 90 degrees so that a power unit having a rotary output perpendicular to the horizontal axis can be coupled to the impeller without using a right angle coupling.

2. The snow thrower of claim 1 wherein the housing includes vanes for directing snow thrown by the impeller.

3. The snow thrower of claim 2 wherein the vane direction is adjustable.

4. The snow thrower of claim 1 wherein the power unit comprises an electric motor.

5. The snow thrower of claim 1 wherein the gear ratio of the first pulley to the second pulley is less than one.

* * * * *